US008251300B2

(12) United States Patent
Wilson

(10) Patent No.: US 8,251,300 B2
(45) Date of Patent: Aug. 28, 2012

(54) PERIPHERAL DIAL SPRINKLER CONTROLLER

(75) Inventor: Chadwick L. Wilson, Woods Cross, UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 700 days.

(21) Appl. No.: 12/401,508

(22) Filed: Mar. 10, 2009

(65) Prior Publication Data

US 2010/0230510 A1 Sep. 16, 2010

(51) Int. Cl.
*B05B 12/02* (2006.01)
*B05B 12/00* (2006.01)

(52) U.S. Cl. ............... 239/70; 239/71; 239/DIG. 15

(58) Field of Classification Search .......... 239/67, 239/69, 70, 71, 73, DIG. 15; 137/624.11–624.22; 700/65, 66, 282–284; D10/40
See application file for complete search history.

(56) References Cited

U.S. PATENT DOCUMENTS

| | | | | |
|---|---|---|---|---|
| 4,592,505 | A * | 6/1986 | Bruninga et al. | 239/69 |
| 4,797,820 | A * | 1/1989 | Wilson et al. | 700/284 |
| 4,846,222 | A * | 7/1989 | Jang | 137/624.12 |
| 5,135,168 | A * | 8/1992 | Wang | 239/70 |
| 5,921,280 | A | 7/1999 | Ericksen et al. | |
| 6,547,211 | B2 * | 4/2003 | Roman | 251/30.01 |
| 6,719,010 | B1 * | 4/2004 | Yi-Chang | 137/624.11 |
| 7,252,113 | B2 * | 8/2007 | Jacobs et al. | 137/624.11 |
| 2005/0060065 | A1 * | 3/2005 | King-Yuan | 700/284 |

OTHER PUBLICATIONS

Orbit Irrigation Products, Inc., "ST2-RF Sprinkler Timer Manual" 2007, pp. 1-19.
Orbit Irrigation Products, Inc., "Users Manual" Nov. 15, 2007, pp. 1-19.
Orbit Irrigation Products, Inc., "Touch-Screen Timer Manual" Mar. 5, 2008, pp. 1-16.
Orbit Irrigation Products, Inc., "Orbit WaterMaster User's Manual" Mar. 6, 2006, pp. 1-53.
Orbit Irrigation Products, Inc., "Installation Manual/User's Manual" Feb. 13, 2007, pp. 1-26.
Orbit Irrigation Products, Inc., "Orbit WaterMaster Installation Manual/User's Manual" Jun. 11, 2001, pp. 1-56.
Orbit Irrigation Products, Inc., "Orbit WaterMaster Installation Manual/User's Manual" Dec. 10, 2002, pp. 1-2.
Orbit Irrigation Products, Inc., "4-Button Digital Hose Faucet Timer Installation and User's Guide" Oct. 25, 2002, pp. 1-2.
Orbit Irrigation Products, Inc., "Installation and User's Guide Hose Faucet Timer 2 Dial Model 62015/91600" Mar. 2, 2005, pp. 1-3.

* cited by examiner

*Primary Examiner* — Darren W Gorman
(74) *Attorney, Agent, or Firm* — Austin Rapp & Hardman

(57) ABSTRACT

A sprinkler controller includes a central portion and a peripheral switch being moveable in an arcuate path relative to the central portion. The peripheral switch may be a peripheral dial that can be rotated about the central portion. The dial may be rotated to select a particular mode of the sprinkler controller. A display screen is positioned on the central portion. At least two controls are also positioned on the central portion. When a mode is selected by using the peripheral dial, the user may then employ the controls (and the display on the screen) to modify the settings for the sprinkler controller. A method of using the sprinkler controller is also disclosed.

16 Claims, 4 Drawing Sheets

PERIPHERAL DIAL SPRINKLER CONTROLLER

BACKGROUND OF THE INVENTION

Sprinkler systems are known in the industry. A property owner may install a sprinkler system (including pipes, valves, and sprinkler heads) on his/her property such that the system can distribute water to specific areas, thereby allowing grass and vegetation to grow. Many neighborhoods now require that each dwelling in the area have a functioning sprinkler system so that lawn and grass will remain green and have an attractive appearance.

Most sprinkler systems generally include a controller. This controller is designed to selectively open and close the valves in the system. When a valve is opened by the controller, water and sometimes other substances, such as fertilizer, will flow and be provided to a particular area.

The controller may enable the property owner to program the sprinkler system so that it will automatically turn on or off at preset times. Some areas of a property may require more or less water than others based upon factors such as the type of vegetation planted, the slope of the land, the number and type of sprinklers in the area, and the degree of exposure to sunlight. As such, the sprinkler controller may also allow the user to set the duration of each watering cycle. Thus, a sprinkler controller enables a property owner or manager to customize a watering system, as desired.

While sprinkler controllers are valuable tools, some users find that establishing or altering settings of a sprinkler controller to a desired configuration can be confusing and time-consuming. It often takes a first-time user 15 to 20 minutes (or even longer) to program the controller to desired settings. Accordingly, it would be an advancement in the industry to devise a sprinkler controller that is more user-friendly and can be intuitively programmed within a few minutes. Such a device is disclosed herein.

BRIEF SUMMARY OF THE INVENTION

The present embodiments relate to a new type of sprinkler controller. The sprinkler controller comprises a central portion and a peripheral switch being moveable in an arcuate path relative to the central portion. The peripheral switch may be a peripheral dial that may be rotated about the central portion. Rotating the dial selects a particular mode of the sprinkler controller. A display screen is positioned on the central portion. At least two controls are also positioned on the central portion.

When a mode is selected, the user may then use the controls (and the display on the screen) to modify and set the settings for the sprinkler controller. For example, if the "SET TIME" mode is selected by rotating the dial, the user may then use the controls to modify/set the time employed by the sprinkler controller. Once the user is finished modifying the time, he or she may then modify the next setting in a similar manner. Such settings may include, for example, the duration of the watering cycle, the start time of the watering cycle, the frequency of the watering cycle. After the desired settings are input, the "RUN" mode may be selected to instruct the controller to operating according to the user-specified settings.

In one embodiment, the sprinkler controller may include a base unit and a removable portion that may be selectively separated from the base unit. In an alternative embodiment, the sprinkler controller is integral and there is no removable portion (i.e., the base unit and removable portion comprise a unitary apparatus and are not designed to be selectively detachable from one another by an end user).

In an embodiment involving a removable portion, the removable portion may be designed to selectively engage the base unit. The removable portion may include a self-contained power source, the central portion, the display screen, the controls, and the peripheral switch. In one embodiment, the controller is designed such that the removable portion may be held in one hand by a person, enabling the person to manipulate the peripheral switch and controls with the person's other hand. In other words, the removable portion may be removed from the base and fit in a person's hand so that he/she can conveniently adjust the settings of the sprinkler system. Once the adjustments are made, the user may return the system to the base unit and the new settings will be implemented.

The present embodiments may also be implemented in connection with a hose tap timer that selectively allows water to flow through a coupled hose based upon control settings input by a user. As with other disclosed embodiments, the hose tap timer may comprise a central portion and a peripheral switch (such as, for example, a rotatable dial) being moveable in an arcuate path relative to the central portion to specific positions to select one or more modes of the hose tap timer. A display screen may also be positioned on the central portion. The central portion may also include at least two controls for altering settings for the hose tap timer. The hose tap timer may further include a hose inlet in fluid communication with the central portion and at least one hose outlet in selective fluid communication with the hose inlet. A user may adjust the sprinkler controller settings using the rotatable dial and the controls to specify, for example, when the water will be turned on, how long the water will run, and how frequently it will be turned on. Once programmed and coupled to an input and output hose, the hose tap timer may be used to automatically control the flow of the water through the hose tap timer in accordance with a specified schedule.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through use of the accompanying drawings in which.

DETAILED DESCRIPTION OF THE INVENTION

The embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
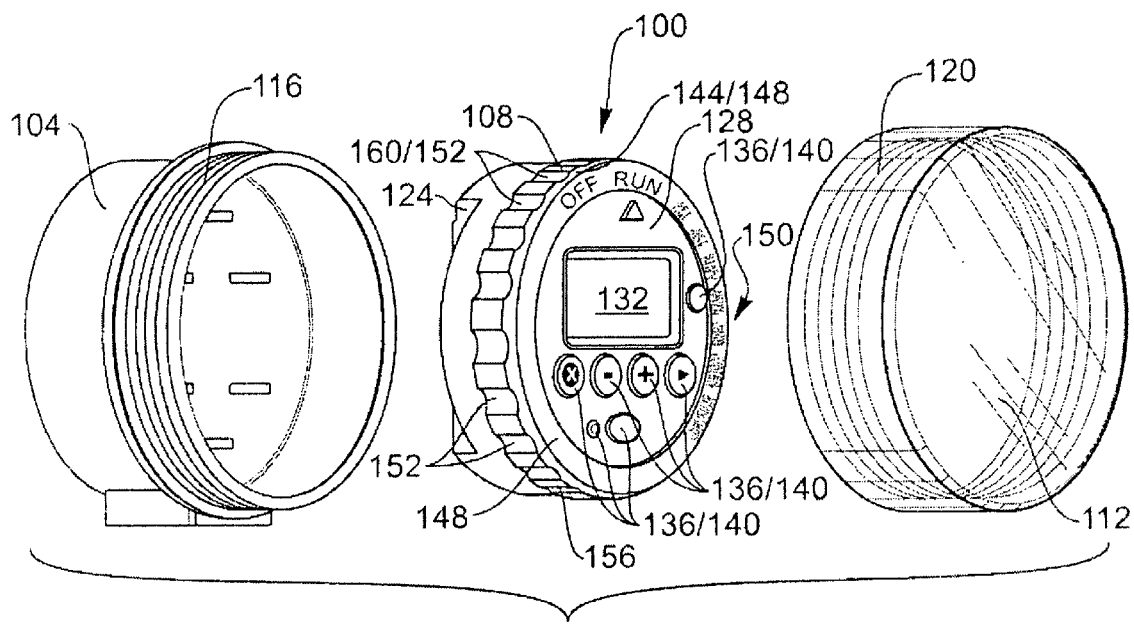
FIG. 1 is an exploded view of one embodiment of a peripheral sprinkler controller.

Referring now to FIG. 1, an exploded view of one embodiment of a peripheral dial sprinkler controller 100 is illustrated. The illustrated sprinkler controller 100 is designed for use in a sprinkler system (not shown). The sprinkler system may be an irrigation system designed to deliver water or other substances, such as fertilizer, via a system of pipes, valves, and sprinkler heads to facilitate growth of grass or vegetation in the area.

The sprinkler system may be divided into various "stations" or "zones." These stations include groups of pipes and sprinkler heads into which water may flow. Each station is controlled by at least one valve. When a particular station is turned on (by opening the pertinent valve or valves), water will flow through the coupled line(s) and water the area serviced by the sprinkler station. When the valve is closed, the station is shut off. This process may be repeated for all of the sprinkler stations.

The sprinkler controller 100 is designed to control the sprinkler system by selectively allowing water to flow into each of the stations. Thus, through use of the sprinkler controller 100, a user may program a sprinkler system to automatically water at designated times. For example, a user may set the sprinkler controller to automatically water at night, while the user is on vacation, or for specified durations. This pattern may vary, for example, based on the day of the week. Thus, using the sprinkler controller 100, a user can customize operation of the sprinkler system.

In one embodiment, the sprinkler controller 100 may include a base unit 104 and a removable portion 108. In an alternative embodiment, the sprinkler controller 100 is integral and there is no removable portion 108 (i.e., the base unit 104 and removable portion 108 comprise a unitary apparatus and are not designed to be selectively detachable from one another by an end user).

In embodiments having a removable portion 108, the removable portion 108 may be selectively detached from the base unit 104. Thus, in such an embodiment, the base unit 104 is shaped and configured to receive the removable portion 108. In some embodiments, the removable portion 108 may be shaped to "snap" fit into the base unit 104. The base unit 104 may be mounted, for example, to a wall or structure of the user's property, such as a garage, basement, storage/electrical room, or shed.

The removable portion 108 may comprise a self-contained power source 124. This power source 124 may comprise one or more batteries (such as lithium, alkaline, or other types of batteries). The power source 124 may be positioned within the removable portion 108, but may be, in one embodiment, accessible to allow the user to replace and/or recharge the batteries. Other embodiments may be designed such that when the removable portion 108 is docked with the base unit 104, the power source 124 is recharged through a coupled electrical power supply. Further embodiments may use a solar power system to recharge the source 124. The power source 124 provides power to the controller 100 to allow the user to program the controller 100 and/or to provide electrical signals that open and close valves within the sprinkler lines.

The removable portion 108 may be a hand-held unit that is shaped and/or sized to fit within a user's hand. In one embodiment, a user may adjust settings of the sprinkler controller 100 while holding the removable portion 108 in his or her hand.

The controller 100 may include a central portion 128. The central portion 128 may comprise an area within the removable portion 108. The central portion 128 includes a changeable display screen 132 capable of displaying information, words, numbers, dates, or times to a user. In some embodiments, this screen 132 may be, for example, a liquid crystal display (LCD) or light emitting diode (LED) screen. Other types of changeable screens may also be used.

The controller 100 also includes one or more controls 136 that are designed for altering settings for the sprinkler controller 100. (These settings will be discussed in greater detail below.) The controls 136 may be positioned on the central portion 128. Using the controls 136, the user can input desired settings for the sprinkler system controller 100. In the embodiment of FIG. 1, these controls 136 comprise buttons 140. Other types of controls 136 may also be used. It should be noted that in the embodiment of FIG. 1, at least two controls 136 are shown. Three or more controls 136 may also be used. The exact number of controls 136 will depend upon the particular embodiment.

The controller 100 may also include a peripheral switch 144. This peripheral switch 144 may be positioned around the central portion 128. The peripheral switch 144 is moveable in an arcuate path relative to the central portion 128 to specific positions. Movement of the switch 144 operates to select a "mode" of the sprinkler controller 100. The switch 144 may be rotated radially and/or circumferentially about the central portion 128 to select a particular mode 150 of the controller 100. In some embodiments, this switch 144 may be a peripheral dial 148 that may be rotated through various positions around the central portion 128 to select the particular mode 150 of the controller 100. This dial 148 may be a full-ring dial in that it extends along the entire perimeter of the central portion 128. A "half-ring" dial or a dial that extends around only a portion of the central portion 128 may also be used.

In some embodiments, such as the embodiment of FIG. 1, the peripheral switch 144 includes a gripping surface 152 that is exposed to the user. This gripping surface 152 may comprise an outer, peripheral surface 156 of the sprinkler controller 100 that allows the user to more readily grip the removable portion 108 and/or rotate the peripheral switch 144 employing the user's fingers. To this end, the gripping surface 152 may include one or more finger grips 160 or other similar features designed for enhanced gripping/traction by the user.

The sprinkler controller may also include a cap 112. The cap 112 may be screwed over the top of the removable portion 108 to protect the removable portion 108. In one embodiment, the cap 112 may be transparent or partially transparent. The cap 112 may, for example, be made of a polymer or other similar materials. In some embodiments, threads 116 used to secure the cap 112 may be positioned on the base unit 104. Of course, in other embodiments, the threads 116 may be added to the removable portion 108. Corresponding threads 120 are added to the cap 112 that engage the threads 116 and secure the cap 112 to the base unit 104 and/or removable portion 108. The threads 116/120 allow the cap 112 to be removably secured to the base unit 104 and/or the removable portion 108. Those skilled in the art will appreciate that other methods or systems of connecting/securing the cap 112 to the base unit 104 and/or the removable portion 108 may also be used.

Figure 2:
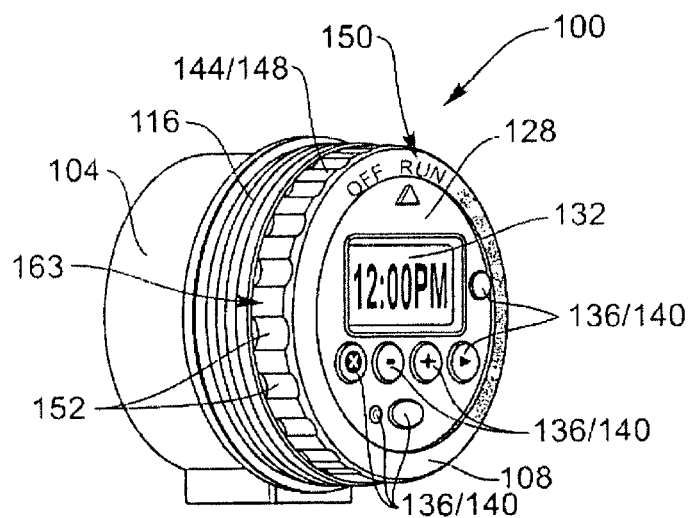
FIG. 2 is a perspective view of a removable portion of the sprinkler controller of FIG. 1 docked with a base unit.

FIG. 2 shows a perspective view of a removable portion 108 docked with the base unit 104. For purposes of clarity, the cap 112 has been removed. As can be seen from FIG. 2, the display screen 132 displays information that may be viewed by a user. In the case of FIG. 2, this information is 12:00 PM, which may indicate the time when a particular sprinkler station will turn on or the current time. Of course, other information may also be displayed such as the duration of time that the sprinkler station will run (e.g., it will run for 45 minutes, etc.), the frequency of watering (e.g., watering every day, twice a day, 3 times a week, etc.), the date, the time, the beginning and/or ending time of the watering period, as well as other information. The user may use the controls 136 to change the various settings of the controller 100.

In one embodiment, the peripheral switch or dial 144/148 is positioned around the periphery 163, or a portion of the periphery 163, of the sprinkler controller 100 to allow the user unimpeded access and to permit easy grasping and manipulation of the peripheral switch or dial 144/148, as illustrated in FIG. 2.

Figure 3:
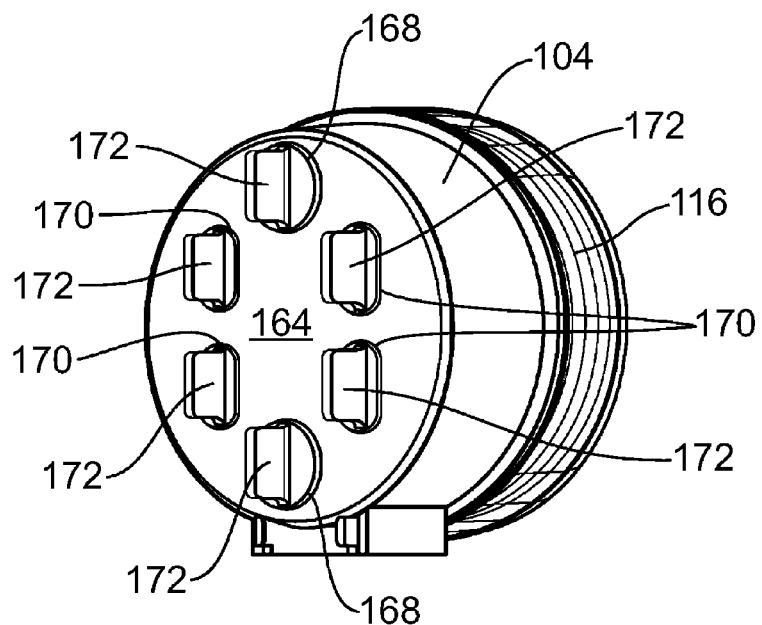
FIG. 3 is a rear, perspective view of the base unit of FIG. 2.

FIG. 3 is a rear, perspective view of the base unit 104. As can be seen in FIG. 3, the rear surface 164 of the base unit 104 may include one or more sensor ports 168. Two sensor ports 168 are shown, although a greater or lesser number of ports 168 may also be used. The ports 168 are shown covered by a plug 172. However, in use, the plug 172 may be removed so that the port 168 may be placed in electronic communication with one or more sensors (not shown). The sensors may be, for example, a moisture sensor that senses precipitation or other types of moisture. If such a sensor is used, the sensor may notify the controller 100 of the precipitation so that the controller 100 may adjust, if desired, the amount of water provided by the sprinkler system based upon the amount of precipitation sensed.

In addition to sensor ports 168, the base unit 104 may also include valve ports 170. Four valve ports 170 are shown, but again a greater or lesser number may be used, as desired. The valve ports 170 are designed to receive wires (or another type of communication conduit) to place the sprinkler controller 100 in electronic communication with sprinkler valves that control the sprinkler stations. Specifically, the controller 100 may send electrical signals via the ports 170 to each particular station that will cause the pertinent valve to open and close at the designated time(s). When the valve is open, water will flow into the pertinent line and the area serviced by the station will be watered via the coupled sprinklers. When the valve is closed, the water stops flowing and the sprinklers in that area are turned off.

Figure 4:
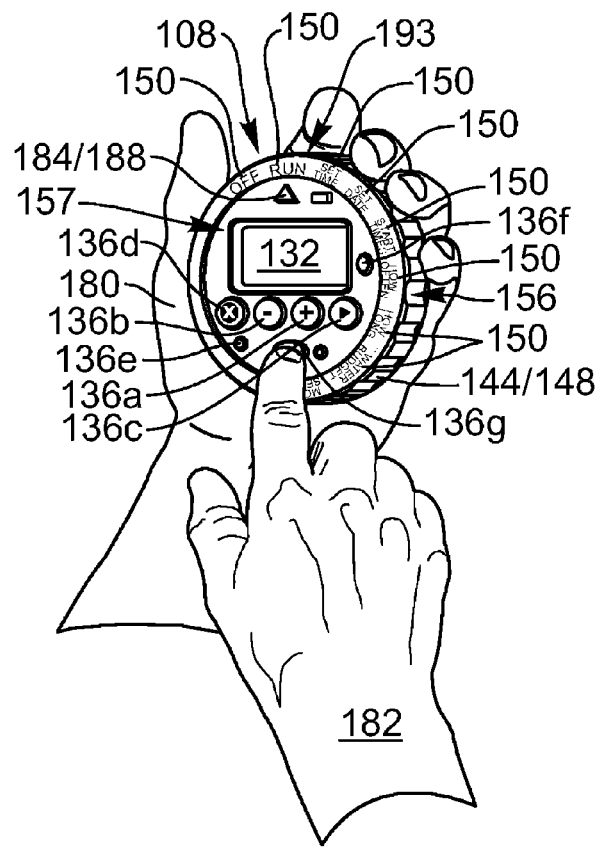
FIG. 4 is a perspective view of the removable portion of the embodiment of FIG. 1 positioned in a user's hand.

FIG. 4 shows an embodiment of the removable portion 108 positioned within a person's hand 180. The removable portion 108 may, in one embodiment, be sized to fit into a single hand of the user, thereby allowing the user to use his/her other hand to rotate the switch 144. The central portion 128 may include an indicator 184 that identifies a selected mode 150 or setting. As shown in this figure, the indicator 184 may be a pointer 188. The indicator 184 shown in this Figure is positioned at the "12:00" o'clock position of the removable portion 108. Other locations of the indicator 184 may also be used, as desired, including, for example, the "3:00" o'clock position, the "6:00" o'clock position, or the "9:00" o'clock position.

As noted above, the user may select the particular modes of the controller 100 by rotating the switch 144. As described herein, the switch 144 may be rotated or moved in an arcuate path, or otherwise adjusted around the perimeter of the central portion to alter the mode 150 of the removable portion 108.

As illustrated in FIG. 4, various modes 150 may be used. Of course, those skilled in the art will appreciate that other modes and settings may also be used. The modes illustrated in FIG. 4 include:

OFF: If this mode is selected, the controller 100 will be turned off such that the controller will not cause the sprinkler stations to turn on and off. This selection is useful during the winter months or other periods of inactivity;

RUN: If this mode is selected, the controller 100 will "run" the specified watering schedule;

SET TIME: In this mode, the user may set and adjust the time of day to be used by the controller 100 (e.g., set the clock in the controller 100 to reflect the current time);

SET DATE: In this mode, the user can select the date and/or the day of the week used by the controller 100;

START TIME: This mode allows the user to program the starting time for the various stations to turn on, as desired (e.g., turn station 1 on at 9:00 a.m., turn station 2 on at 10:00 a.m.);

HOW OFTEN: This mode allows the user to set how often the watering will occur (e.g., every 3 days, every day, once a week, twice a day, on specified days of the week);

HOW LONG: This mode allows the user to specify how long each particular station will be turned on (e.g., station 1 will be on for 20 minutes, station 2 will be on for 1 hour);

WATER BUDGET: This mode enables a user to specify the particular percentage of the specified watering time to be used at each station. For example, by specifying 50%, a user could reduce the watering times for each station without individually adjusting the station watering times; and MOISTURE SENSOR: This mode enables a user to specify whether a moisture sensor will be employed to reduce or augment watering times.

It should be noted that the above-recited modes are exemplary. (Likewise, different names for the mode may be devised or placed on the face 157 of the switch or dial 144/148, as well). Other modes or settings may also be used including, for example, a setting such as "RAIN DELAY," which allows the user to skip one or more watering cycles. Another potential setting is that of "MANUAL WATERING," which allows the system to water once and then stop.

Once the user has selected a particular mode 150, the user may modify the settings in this mode 150 using the controls 136. In some embodiments, these controls 136 may be an increment control 136*a* and a decrement control 136*b*. The increment control 136*a* allows a user to increase an indentified value, whereas the decrement control 136*b* allows a user to decrease the value. For example, if the "HOW OFTEN" setting were selected, the user could adjust the frequency of the watering schedule by pressing the increment control 136*a* and a decrement control 136*b*, as desired. Likewise, if the "SET TIME" mode were selected, the user could adjust the time, hours, or minutes by pressing these controls 136*a*, 136*b*. Those skilled in the art will appreciate how the various settings may be adjusted in this manner.

In other embodiments, the controls 136 may further include an "arrow over" control 136*c*. This control 136*c* allows a user to move or change the focus to different settings within the designated mode. For example, in one embodiment, different start times may be specified within the "START TIME" mode. The "arrow over" control 136*c* could allow a user to change the focus from one start time to another. Once the focus is changed to another start time, the user may employ the increment/decrement controls 136*a*, 136*b* to adjust the start time. Thus, the arrow over control 136c allows the user to toggle between the adjustable values in each particular mode.

In some embodiments, the controls 136 may also include a cancel or stop control 136d. If the user presses this control, active watering or a rain delay will be terminated.

The controls 136 may also include a "reset" control 136e that may allow the user to quickly reset the controller 100 or modes of the controller 100 to factory default settings.

Other types of controls 136 may include an "A-B" button 136f. Employing this control, various stations may be set to water on different schedules, namely "schedule A" or "Schedule B" (or even to water on both Schedule A and Schedule B). In other words, the stations designated to water on Schedule A may be set to water more frequently and/or for longer durations than the stations on Schedule B (or vice versa). By using the A-B control 136f, the user can designate the particular stations that will run on Schedule A and those that will run on Schedule B. Other embodiments may also be constructed to employ yet additional schedules (such as Schedule C, Schedule D, etc.).

Further embodiments of the controller 100 may include yet additional controls, such as a manual start control 136g. The manual start control 136g operates to immediately initiate watering, causing the controller 100 to transmit an open signal to one of the coupled valves.

Again, it should be noted that the various controls and/or modes described herein are exemplary. Any type of control, mode, or setting may be used as a means of controlling the sprinkler system.

It should be noted that the present embodiments provide for significant advantages over other controllers. For example, in certain embodiments, when the removable portion 108 is placed in a user's hand 180, he or she may quickly use his/her other hand 182 to move the peripheral switch 144 in an arcuate path to pick the particular mode that needs to be adjusted. Then, using the controls 136, the desired adjustments may be accomplished quickly. In fact, testing has indicated that the user can program the sprinkler system using the controller 100 much more rapidly than by using other systems. In fact, some tests have indicated that the average time required by the user to program the system via the controller 100 decreased from more than 5 minutes to about 2 minutes. Thus, the system allows rapid adjustment of sprinkler controller settings.

One advantage of the disclosed embodiment is the use of a peripheral switch or dial 144/148 and a central portion 128 with a display screen 132 and controls 136a-f. This configuration permits use of large and easily identifiable text or symbols to indicate the selected and available modes while employing a compact design. As indicated above, this design also allows the user to easily grasp and rotate the peripheral switch or dial 144/148. As a result, a user can easily determine and change the mode of the sprinkler controller. In the embodiment shown in FIG. 4, the peripheral switch or dial 144/148 is positioned around the periphery 193, or a portion of the periphery 193, of the removable portion 108 to allow a user unimpeded access to the peripheral switch or dial 144/148 and to permit easy grasping and manipulation of the switch or dial 144/148.

Another advantageous feature of the present embodiments is that the removable portion 108 is portable such that the user can walk around and make the necessary adjustments to the settings from any location, not just standing next to the base unit 104 (shown in FIG. 3). This enables a user to make adjustments to the settings/modes while being physically present at different areas of a relevant property and viewing firsthand whether a particular area is getting sufficient water. By adjusting the setting while the user is inspecting the property, optimization of the water usage may more easily be achieved.

Once the user has made the appropriate changes to the modes, the user may then dock the removable portion 108 back in the base unit 104 and the appropriate changes will be implemented.

Figure 5:
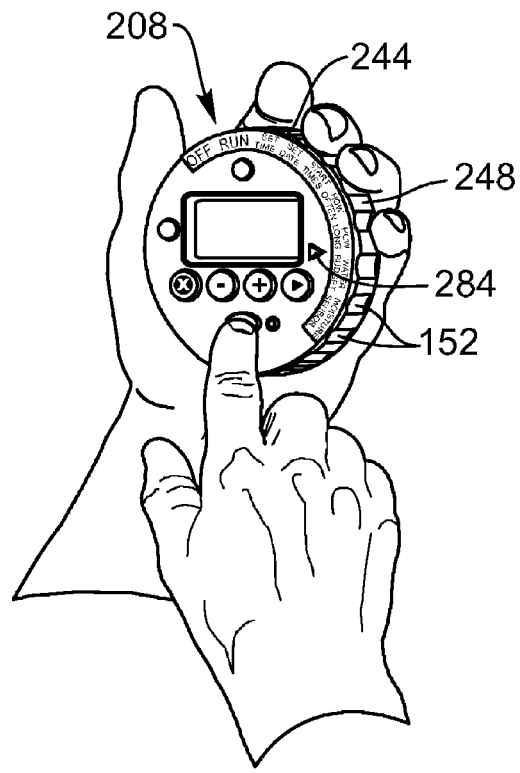
FIG. 5 is a perspective view of another embodiment of a removable portion positioned in a user's hand.

FIG. 5 is a perspective view of another embodiment of a removable portion 208 that may be used as part of a controller 100. The removable portion 208 is similar to that which is described above in conjunction with FIGS. 1-4. Accordingly, in the interest of brevity, this description will not be repeated.

The removable portion 208 differs from that which was described above in that the indicator 284 is positioned at the 3:00 o'clock position rather than the 12:00 o'clock position discussed above. Also, the peripheral switch 244 comprises a twistable dial 248 that circumscribes only half, or another portion, of the removable portion 208. (This switch 244 may have a gripping surface 152 as noted above.) This "half-ring" peripheral switch 244 still allows the user to rotate the switch 244 in an arcuate path to select the desired mode 150. Specifically, rotating this half-ring dial 248, the controller 100 will be set to the various modes so that the settings may be updated or adjusted in the manner described above.

Figure 6:
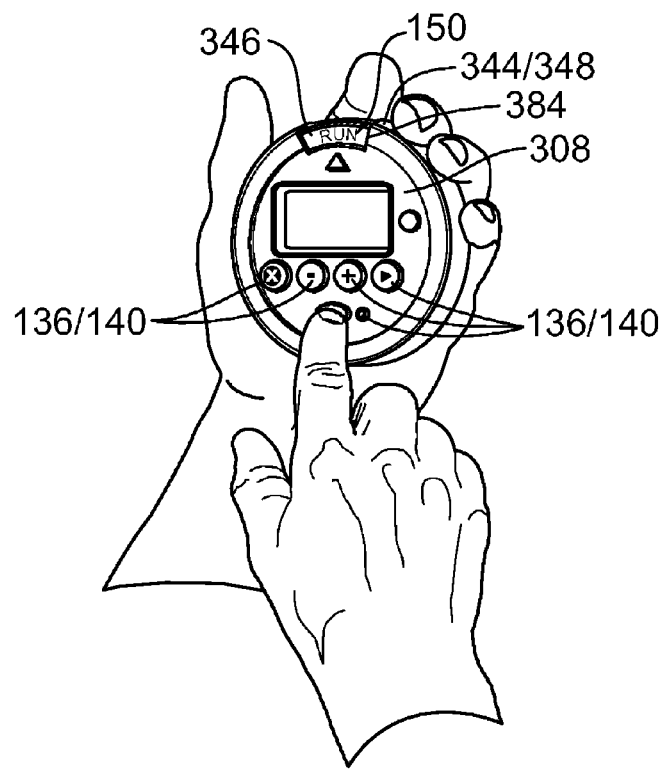
FIG. 6 is a perspective view of another embodiment of a removable portion positioned in a user's hand.

FIG. 6 is a perspective view of yet another embodiment of a removable portion 308 that may be used as part of a controller 100. In this embodiment, the peripheral switch 344 may still be moved/rotated in an arcuate path to select the desired mode 150. This switch 344 may be a peripheral dial 348 that extends around all or a portion of the removable portion 308. The switch 344 may have a gripping surface 152 as described above. However, in this embodiment, the text indicating the various modes is printed directly on the body of the removable portion 308 (or on other portions of the controller). A window 346 functions as the indicator 384. Specifically, this window 346 is an area of the peripheral switch 344 that is transparent or otherwise highlighted so that the user can see the text by through the window 346. The alignment of the text within the window 346 indicates the mode 150 that has been selected. For example, if the "HOW OFTEN" words are viewable through the window 346, the user will be in the "HOW OFTEN" mode and will be able to adjust the settings for the identified mode using the controls 136.

Figure 7:
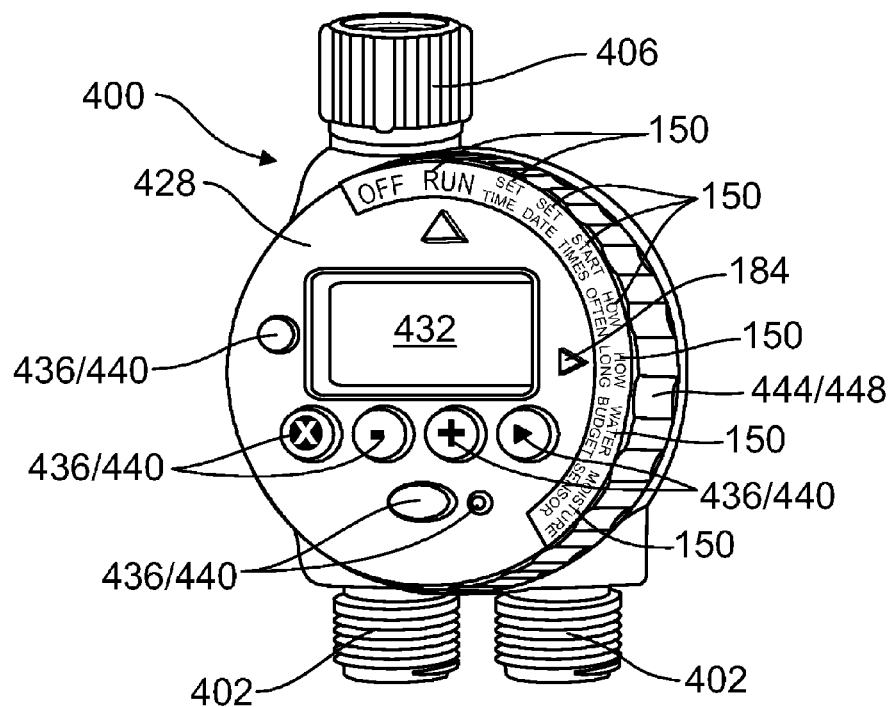
FIG. 7 is a perspective view of an embodiment of a hose tap timer.

FIG. 7 shows another embodiment of the present invention. Specifically, FIG. 7 illustrates a hose tap timer 400. The hose tap timer 400 is designed to be connected to a hose (not shown). Accordingly, the hose tap timer 400 includes at least one hose outlet 402 and one hose inlet 406. The hose tap timer 400 selectively places the hose inlet 406 in fluid communication with the hose outlet 402 to allow water to flow through the tap timer 400. As shown in FIG. 7, two outlets 402 may be used. However, more than two outlets 402 may be employed as well. Other embodiments may be designed with only a single outlet 402.

The hose tap timer 400 may include a central portion 428 that may be positioned intermediate the outlet 402 and the inlet 406. The central portion 428 includes display screen 432 that is similar to and/or identical to the display screen (e.g., part number 132 of FIG. 1) described above. The central portion 428 may also include at least two controls 436, which, as noted above, may be buttons 440. The controls 436 may be similar and/or identical to that which is described above and may operate to allow the user to adjust the settings of the hose tap timer 400 (and more specifically, the water flow through the hose tap timer 400).

As with the other disclosed embodiments, the hose tap timer 400 may include a peripheral switch 444. This peripheral switch 444 may be a dial 448 or other feature that is capable of moving in an arcuate path relative to the central portion 428 to specific positions to select one or more modes 150 of the hose tap timer 400. In other words, a user may move the peripheral switch 444 in an arcuate path around the central portion 428 to select the desired mode. Once selected, the user may then manipulate the settings of the selected mode to adjust/set the watering times and other settings controlling when the water will flow through the tap timer 400. The embodiment of FIG. 7 includes a half-ring dial 448 with an indicator 184 at the 3:00 o'clock position. Other configurations/positions of the indicator 184 may be used, as noted herein (including having the indicator positioned at the 12:00 o'clock position). Also, a full-ring dial 448 may also be used.

As with the embodiments discussed above, the hose tap timer 400 may be sized to be held in one hand by a person, enabling the person to manipulate the peripheral switch 444 and controls 436 with the person's other hand. Thus, the user can pick up this unit in one hand, even when it is attached to a hose, and conveniently make the desired changes to the mode and settings with the other hand. In other embodiments, there may be a base unit and a removable portion that houses the central portion 428, as discussed above. The embodiment disclosed in FIG. 7 may include modes, settings, and controls similar to or the same as those illustrated in the embodiments shown in FIGS. 1-6.

Figure 8:
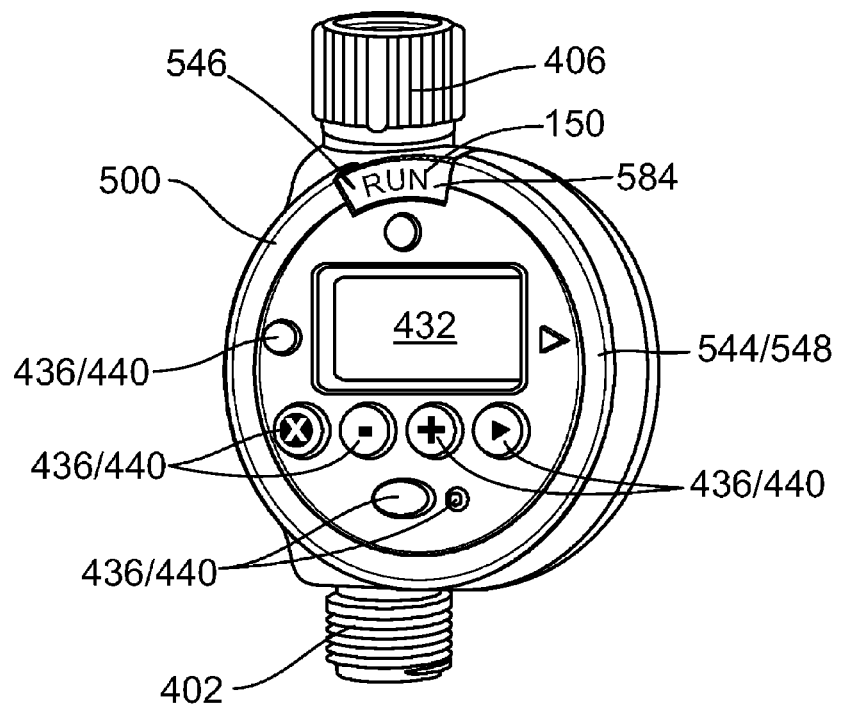
FIG. 8 is a perspective view of another embodiment of a hose tap timer.

FIG. 8 illustrates another embodiment of a hose tap timer 500. The illustrated hose tap timer 500 is similar to the embodiment discussed in conjunction with FIG. 7. However, the difference between this embodiment and the embodiment discussed above is that tap timer 500 of FIG. 8 includes an indicator 584 that comprises a transparent window 546 or window that otherwise highlights the selected mode. Accordingly, when the peripheral switch or dial 544/548 is rotated, the text will appear through the window 546 indicating that the identified mode 150 has been selected. In other embodiments, text or symbols representing the selected mode are viewable or highlighted by the window 546 and the text or symbols representing non-selected modes are viewable as well, but, for example, are visible through a darker or different colored material. Also, the window 546 may simply comprise an opening.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A fluid control device comprising a sprinkler controller or a hose tap timer, the fluid control device comprising:
    a central portion;
    a peripheral switch being moveable in an arcuate path relative to the central portion to specific positions to select a mode of the fluid control device;
    a display screen positioned on the central portion; and
    at least two controls positioned on the central portion for altering settings for the fluid control device.

2. The fluid control device of claim 1, wherein the fluid control device comprises a removable portion and a base unit, the removable portion being separable from the base unit, wherein the removable portion comprises the central portion, the display screen, the at least two controls, and the peripheral switch.

3. The fluid control device of claim 2, wherein the removable portion is sized to be held in one hand by a person, enabling the person to manipulate the peripheral switch and controls with the person's other hand.

4. The fluid control device of claim 1, further comprising an indicator identifying a selected mode of the fluid control device.

5. The fluid control device of claim 4, wherein the indicator comprises a pointer on the central portion.

6. The fluid control device of claim 4, wherein the indicator comprises a window on the peripheral switch that identifies the selected mode.

7. The fluid control device of claim 1, wherein the peripheral switch comprises a peripheral dial.

8. The fluid control device of claim 7, wherein the peripheral dial comprises a full-ring dial.

9. The fluid control device of claim 7, wherein the peripheral dial comprises a half-ring dial.

10. The fluid control device of claim 1,
    wherein the peripheral switch has an exposed, gripping surface that comprises an outer, peripheral surface of the fluid control device; and
    wherein the at least two controls comprise an increment control, a decrement control, and an arrow over control.

11. The fluid control device of claim 10, wherein the removable portion is sized to be held in one hand by a person, enabling the person to manipulate the peripheral switch and controls with the person's other hand.

12. The fluid control device of claim 10, further comprising an indicator identifying a selected mode of the fluid control device.

13. The fluid control device of claim 12, wherein the indicator comprises a pointer on the central portion.

14. The fluid control device of claim 12, wherein the indicator comprises a window on the peripheral switch that can be rotated to identify the selected mode.

15. The fluid control device of claim 1, wherein the fluid control device comprises the hose tap timer, the hose tap timer further comprising:
    a hose inlet in fluid communication with the central portion; and
    at least one hose outlet in selective fluid communication with the hose inlet.

16. The fluid control device of claim 15, wherein the hose tap timer is sized to be held in one hand by a person, enabling the person to manipulate the peripheral switch and controls with the person's other hand.

* * * * *